(12) United States Patent
Heim (10) Patent No.: US 7,744,129 B2
(45) Date of Patent: Jun. 29, 2010

(54) AREAL SECURITY ELEMENT AND METHOD FOR PRODUCING IT

(75) Inventor: Manfred Heim, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 919 days.

(21) Appl. No.: 10/554,857

(22) PCT Filed: Apr. 27, 2004

(86) PCT No.: PCT/EP2004/004438

§ 371 (c)(1),
(2), (4) Date: Oct. 23, 2006

(87) PCT Pub. No.: WO2004/097112

PCT Pub. Date: Nov. 11, 2004

(65) Prior Publication Data

US 2007/0114787 A1    May 24, 2007

(30) Foreign Application Priority Data

Apr. 28, 2003   (DE) ................................ 103 19 232

(51) Int. Cl.
| | |
|---|---|
| B42D 15/00 | (2006.01) |
| B42D 15/10 | (2006.01) |
| G03H 1/00 | (2006.01) |
| F21V 9/04 | (2006.01) |
| F21V 9/06 | (2006.01) |
| G02B 5/08 | (2006.01) |
| G02B 5/20 | (2006.01) |
| G02B 1/10 | (2006.01) |

(52) U.S. Cl. .................. 283/72; 283/94; 283/901; 283/82; 283/117; 359/2; 359/359; 359/360; 359/584

(58) Field of Classification Search .................. 283/85, 283/86, 91, 94, 902; 359/2, 359, 360, 580, 359/584, 585, 586, 587, 589; 428/30, 156, 428/167; B42D 15/10
See application file for complete search history.

(56) References Cited

U.S. PATENT DOCUMENTS 4,705,356 A    11/1987   Berning et al.

(Continued)

FOREIGN PATENT DOCUMENTS

EP          0 330 733 A       9/1989

(Continued)

*Primary Examiner*—Dana Ross
*Assistant Examiner*—Justin V Lewis
(74) *Attorney, Agent, or Firm*—Rothwell, Figg, Ernst & Manbeck, P.C.

(57) ABSTRACT

An areal security element for security papers, documents of value and the like, with at least two different areal security features (20, 22) disposed one above the other, which each are recognizable upon viewing the security element from opposite sides, wherein the first security feature (20) has a thin-layer element (42) provided with an areal diffraction structure (46) with color shift effect, which contains a first reflection layer (40) with a first color effect, the second security feature (22) has a second reflection layer (44) provided with an areal diffraction structure (46) for producing a diffractive image, which shows a second color effect different from the first color effect, and wherein the thin-layer element (42) of the first security feature (20) and the reflection layer (44) of the second security feature (22) are provided with the same areal diffraction structure (46).

39 Claims, 3 Drawing Sheets

U.S. PATENT DOCUMENTS

| | | |
|---|---|---|
| 5,961,432 A | 10/1999 | Murakami et al. |
| 6,157,489 A | 12/2000 | Witzman et al. |
| 6,616,803 B1 | 9/2003 | Ridyard et al. |
| 6,761,959 B1 * | 7/2004 | Bonkowski et al. ......... 428/156 |
| 6,821,506 B2 | 11/2004 | Lanza et al. |

FOREIGN PATENT DOCUMENTS

| | | |
|---|---|---|
| GB | 2 325 883 A | 12/1998 |
| WO | WO 01/03945 A | 1/2001 |
| WO | 199 41 295 A | 3/2001 |
| WO | WO 2004/028824 A | 4/2004 |

* cited by examiner

AREAL SECURITY ELEMENT AND METHOD FOR PRODUCING IT

CROSS-REFERENCE TO RELATED APPLICATION

This application is a National Phase of International Application Serial No. PCT/EP2004/004438, filed Apr. 27, 2004.

BACKGROUND OF INVENTION

1. Field of the Invention

The invention relates to an areal security element for security papers, documents of value and the like, a security paper for producing security documents and a document of value with such a security element. The invention in particular relates to a security element in the form of a security stripe or a security thread for embedding in a security document, or in the form of a transfer element for applying onto a security paper, document of value and the like.

2. Description of the Background Art

From the print WO 95/10420 a document of value is known, into which a through opening is punched subsequently to its manufacturing, which then on one side is closed with a cover foil that projects beyond the opening on all sides. Since the cover foil at least in partial areas is transparent, when copying the document of value the background will be visible and thus renders the copy recognizable as such. The cover foil can also have a security feature, such as a hologram.

A general problem with the manufacturing of security elements is that standard holograms with an aluminum reflection layer become more and more freely available. For that reason the security standard of such standard holograms and of the documents of value equipped therewith diminishes more and more.

SUMMARY OF THE INVENTION

On these premises the invention is based on the problem to specify a security element, which, compared to prior art, has an increased forgery-proofness.

This problem is solved by the areal security element with the features of the main claim. A security paper for producing security documents and a document of value with such a security element as well as production method for such a security element are subject matter of the independent claims. Developments of the invention are subject matter of the subclaims.

The security element according to the invention contains at least two different areal security features disposed one above the other, which each are recognizable upon viewing the security element from opposite sides, the first security feature having a thin-layer element with color shift effect provided with an areal diffraction structure, which contains a first reflection layer with a first color effect. The second security feature has a second reflection layer provided with an areal diffraction structure for producing a diffractive image, which shows a second color effect different from the first color effect. The thin-layer element of the first security feature and the reflection layer of the second security feature are provided with the same areal diffraction structure.

Multilayer thin-layer elements basically are known security features for security elements. The color impression of the thin-layer element changes with the viewing angle for example from green to blue, from blue to magenta, or from magenta to green. This color effect is based on interference effects that result from multiple reflections in the various partial areas of the thin-layer element and is explained, for example, in the print EP 0 395 410 B1 in detail. Such color changes are referred to as color shift effect in the following. Although security elements with color shift effect in principle are already known, there is still a need for security elements that are further improved and offer a higher forgery-proofness.

According to the invention for this purpose a security feature with an areal diffraction structure observable in reflected light, for example a hologram, is supplemented by a further security feature with color shift effect, which is provided with the same areal diffraction structure. Upon viewing the security element from the side of the one security feature a diffractive image with color shift effect is recognizable, upon viewing the security element from the side of the other security feature a diffractive image with the color impression of the second reflection layer is recognizable. Therefore this security element, compared to known security elements, can only be imitated with substantially more effort. Furthermore, the proposed design represents an optically appealing identification feature, which can easily be recognized and evaluated as authentic even by a layman.

The thin-layer element of the first security feature beside the first reflection layer advantageously contains an interference layer with color shift effect. In particular, the interference layer preferably has at least one absorber layer and at least one dielectric layer, which is disposed intermediate between the first reflection layer and the absorber layer. Here likewise a plurality of absorber layers and dielectric layers can be disposed alternately one above the other. Instead of the alternating sequence of absorber layers and dielectric layers an alternating sequence of dielectric layers with high or low refractive index can be provided likewise. The color shift effect is the stronger, the greater the difference between the refractive indices of neighboring dielectric layers or the more layers with alternately high and low refractive indices with appropriate layer thicknesses are disposed one above the other.

The absorber layers are typically formed by thin metal layers with a thickness of 4 nanometers to 20 nanometers. Suitable metals are, in particular, chromium, iron, gold, aluminum or titanium, but also more rare metals, such as vanadium, palladium or molybdenum. Furthermore, for example nickel, cobalt, tungsten, niobium or compounds and alloys of the said metals, such as for instance nickel-chromium-iron, can also be used. Further suitable materials for the absorber layers are stated in print WO 01/03945, the disclosure of which in this respect is included in the present application.

Suitable materials for the dielectric layers are, in particular, vapor-depositable and transparent materials. Suitable materials with a refractive index smaller than 1.7 are, for example, silicon dioxide, aluminum oxide, magnesium fluoride or $SiO_x$, with $1<x<2$. Materials with a higher refractive index, such as for instance zirconium oxide, zinc sulphide, titanium dioxide or indium-tin-oxide can be used likewise. From the print WO 01/03945 appear further suitable materials for the dielectric layers and the disclosure of this print in this respect is included in the present application. The dielectric layers typically have a layer thickness of approximately 100 nanometers to approximately 1000 nanometers, preferably of approximately 200 nanometers to approximately 500 nanometers.

Preferably, the first reflection layer and/or the second reflection layer are formed by a metal layer. In particular, the first and second reflection layer advantageously are formed by different-colored metals, and it is especially advantageous, when the first reflection layer is formed by a metal highly reflective in the visible spectral region and the second reflection layer is formed by a metal poorly reflective in the visible spectral region. In general, the higher the reflection coefficient of the first reflection layer, the more striking is the color shift effect.

In a preferred embodiment of the security element the first reflection layer is formed by a metal of the group aluminum, silver or nickel. The second reflection layer advantageously is formed by a metal of the group copper, gold, iron or chromium. The various colors of the metals used permit appealing optical contrasts upon viewing the security element, which are described in detail thereinafter. Expediently, the first and second reflection layer are disposed directly one above the other.

The absorber layers, the dielectric layers and the reflection layers preferably are applied onto a carrier by means of a vacuum vapor deposition method. The carrier can be formed, for example, by an embossed lacquer layer provided with a diffraction structure, which forms part of the finished security element. The layers can also be produced on an intermediate carrier, which is removed when finishing the security element or at the latest when the security element is applied onto or incorporated into an object. Suitable vapor deposition methods are, for example, PVD methods, such as vapor deposition with evaporation boat, vapor deposition by resistance heating or induction heating, AC and DC sputtering methods, electron beam vapor deposition or arc vapor deposition, but also CVD methods, such as sputtering in reactive plasma or other plasma-activated vapor deposition methods.

According to a preferred development the first and/or second security feature of the areal security element has recesses in the form of patterns, characters or codings. The recesses can have the form of, for example, alphanumeric characters or numerals in positive or negative writing, but also in the form of any picture representations. Such an identification mark represents a further security feature, which further improves the forgery-proofness of the security element and which presents itself to the viewer in an appealing fashion and with an optical effect easily detectable even for the layman.

In a first advantageous embodiment the second reflection layer has recesses in the form of patterns, characters or codings. Then in particular when viewing the security element from the side of the first security feature, a diffractive image in combination with a color shift effect is recognizable. When viewing the security element from the side of the second security feature, a diffractive image with the second color impression is recognizable in the areas not provided with recesses, and with the first color impression in the recesses of the second reflection layer.

Since the thin-layer element of the first security feature and the reflection layer of the second security feature have the same diffraction structure, the second reflection layer and the first reflection layer recognizable through the recesses of the second reflection layer reconstruct the same diffractive image. The various color effects within the diffractive image create an appealing optical impression.

According to another advantageous embodiment, wherein the thin-layer element beside the first reflection layer has an interference layer with color shift effect, the interference layer is provided with recesses in the form of patterns, characters or codings. These recesses can be formed alternatively or additionally to the above-described recesses of the second reflection layer. In particular, upon viewing the security element from the side of the first security feature, in the areas not provided with recesses a diffractive image in combination with a color shift effect, and in the recesses of the interference layer the color impression of the first reflection layer without color shift effect is recognizable. Upon viewing the security element from the side of the second security feature, a laterally reversed diffractive image with the second color impression is recognizable.

According to a further advantageous embodiment, wherein the thin-layer element beside the first reflection layer again has an interference layer with color shift effect, the first reflection layer and the interference layer are provided with congruent recesses in the form of patterns, characters or codings. Then in particular upon viewing the security element from the side of the first security feature, in the areas not provided with recesses a diffractive image in combination with a color shift effect, and in the recesses of the interference layer and the first reflection layer the color impression of the second reflection layer without color shift effect is recognizable. Upon viewing the security element from the side of the second security feature, a laterally reversed diffractive image with the second color impression is recognizable.

According to a further advantageous embodiment the first reflection layer and the second reflection layer have congruent recesses in the form of patterns, characters or codings. By this means, in particular, there can be achieved, that upon viewing the security element from the side of the first security feature, a diffractive image in combination with a color shift effect and recesses being transparent or semitransparent in transmitted light are recognizable. When viewing the security element from the side of the second security feature, a laterally reversed diffractive image with the second color impression with recesses being transparent or semitransparent in transmitted light is recognizable. The transparency of the recesses depends on the layer sequence, the material composition and the thickness of the thin-layer element. As needed, by this means there can be selectively produced recesses as transparent as possible or recess areas tinted in certain colors.

In a further preferred embodiment the first reflection layer has recesses in the form of patterns, characters or codings. In particular, upon viewing the security element from the side of the first security feature, a diffractive image in combination with a color shift effect with additional color effects in the recesses is recognizable, since the reflector of the thin-layer element is formed partly by the first and partly by the second reflection layer. Since the color impressions and the reflecting properties of the two reflection layers differ from each other, the color shift effect is modulated with the pattern of the recess. The more different the materials selected for the two reflection layers, the clearer the modulation of the color shift effect is recognizable. Upon viewing the security element from the side of the second security feature, a laterally reversed diffractive image with the second color impression is recognizable.

It is understood, that all the recesses referred to hereinbefore can be combined with each other in the various layers or layer sequences, so as to simultaneously produce different optical effects in the security element. The recesses in the various layers can be disposed side-by-side—i.e. not in an overlapping fashion—, preferably partially overlapping, especially preferred in a congruent fashion.

In an advantageous development the areal security features of the security element are applied onto a common carrier foil, in particular a transparent carrier foil.

The security element according to the invention in particular can be expediently used, where it can be viewed from opposite sides. It can be disposed in or above an opening of a security paper or a document of value, or in or above a transparent area of such documents. Openings and transparent areas together are referred to as window areas of a document in the following.

Likewise, it is possible, that the security element is employed as a security stripe, or as a security thread, for instance as a window security thread or as a pendulum security thread. With the latter the security element alternately comes to the surface on the front and back of the embedding document and therefore can be viewed from the two sides. The layer structure of such security threads expediently is protected with a laminating foil.

In another expedient embodiment the security element forms a transfer element for applying onto a security paper, document of value and the like. The areal security features of such a transfer element expediently are applied via a separation layer onto a transfer foil.

The invention also comprises a security paper for producing security documents, such as bank notes, ID cards or the like, with an above-described security element. The security paper may contain at least one through window area, which is covered with the security element, so that in the window area the two areal security features are recognizable upon viewing from opposite sides.

The invention furthermore contains a document of value, such as a bank note, an ID card or the like, which is provided with an above-described security element. The document of value may contain at least one through window area, which is covered with the security element, so that in the window area the two areal security features are recognizable upon viewing from opposite sides.

The security element according to the invention or a security paper or document of value provided therewith can be used, for example, for protecting goods of any kind.

A method for manufacturing an areal security element for security papers, documents of value and the like, comprises the procedure steps:

a) manufacturing an embossed lacquer layer with an areal diffraction structure, b) applying a thin-layer element with color shift effect onto the embossed lacquer structure, which contains a first reflection layer with a first color effect, in such a way that the diffraction structure of the embossed lacquer layer continues to exist in the thin-layer element and c) applying a second reflection layer with a second color effect different from the first color effect onto the thin-layer element, in such a way that the diffraction structure of the embossed lacquer layer and of the thin-layer element continues to exist in the second reflection layer.

The applying of the thin-layer element advantageously is effected by successively applying an absorber layer, a dielectric layer and the first reflection layer. In particular the said layers are deposited onto the embossed lacquer structure by a vacuum vapor deposition method. In a preferred method variant the second reflection layer is applied directly onto the first reflection layer.

For further improving the forgery-proofness, especially preferred, recesses in the form of patterns, characters or codings are incorporated into the thin-layer element, in particular into the first reflection layer and/or into the second reflection layer.

An alternative method for manufacturing an areal security element for security papers, documents of value and the like comprises the procedure steps:

α) manufacturing an embossed lacquer layer with an areal diffraction structure,

β) applying a reflection layer with a predetermined color effect onto the embossed lacquer structure, so that the diffraction structure of the embossed lacquer layer continues to exist in the reflection layer, and χ) applying a thin-layer element with a color shift effect onto the reflection layer, which contains a further reflection layer with a further color effect different from the predetermined color effect of the reflection layer applied first, so that the diffraction structure of the embossed lacquer layer and of the reflection layer applied first continues to exist in the thin-layer element.

With this production method the application of the thin-layer element advantageously is effected by successively applying the further reflection layer, a dielectric layer and an absorber layer. The further reflection layer preferably is applied directly onto the reflection layer applied first. Then the layer sequence via a separation layer can applied onto a transfer foil.

Here, too, preferably for further improving the forgery-proofness recesses in the form of patterns, characters or codings are incorporated into the reflection layer applied first and/or into the thin-layer element, in particular into the further reflection layer.

In certain embodiments, in particular when the first and second reflection layer lying directly one above the other might tend to local element formation and thus to corrosion, a spacer layer is incorporated intermediate between the two reflection layers. The spacer layer consists of e.g. oxide layers, such as $MgF_2$, $SiO_2$, $SiO_x$ or ZnS, and preferably is vapor-deposited. Preferably, the spacer layer is very thin, so that diffraction structures existing in the security element are exactly reproduced in the other layers. The spacer layer in particular has a maximum thickness of 500 nanometers.

The spacer layer can also be made of a multilayer composite, in particular in order to optimally adjust the adhesion properties between the first reflection layer, the spacer layer, and the second reflection layer. A suitable multilayer composite is, for example, a layer sequence consisting of a chromium layer which has a thickness of a few nanometers, lying above a $SiO_2$ layer, which is located above a chromium layer which again has a thickness of a few nanometers.

BRIEF DESCRIPTION OF THE DRAWINGS

Further embodiments and advantages of the invention are explained in the following with reference to the Figures. For clarity's sake the figures do without a true-to-scale and true-to-proportion representation.

DETAILED DESCRIPTION OF THE INVENTION

Figure 1:
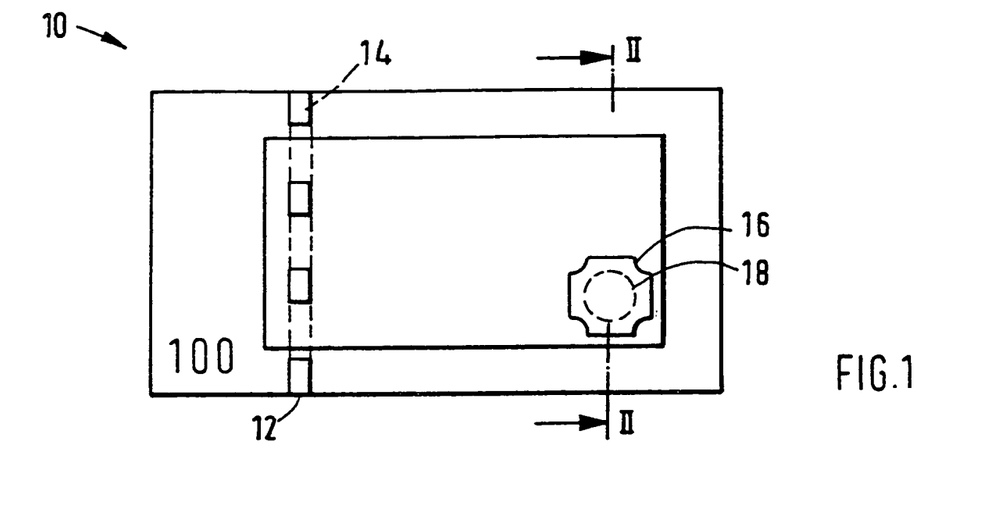
FIG. 1 shows a schematic representation of a bank note with embedded security thread and bonded transfer element, each according to an embodiment of the invention.

FIG. 1 shows a schematic representation of a bank note 10, which is provided with an embedded pendulum security thread 12 and a bonded transfer element 16, both according to an embodiment of the invention. The pendulum security thread 12 comes to the surface in certain areas 14 of the front of the bank note 10. In other areas, marked by dashed lines in the Figure, it passes through the bank note paper and comes to the surface at the back of the bank note.

Figure 2:
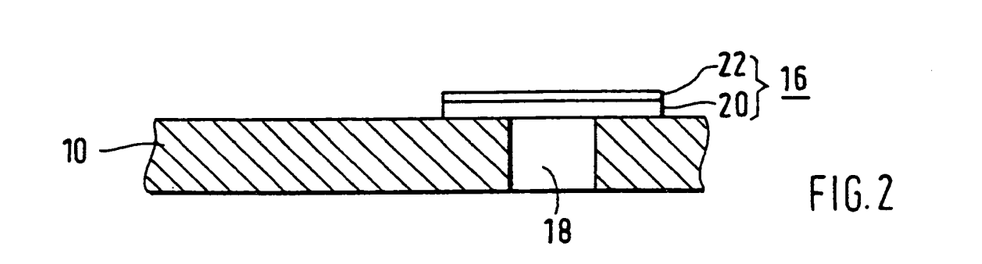
FIG. 2 shows a section through the bank note of FIG. 1 along the line II-II.

The bank note 10 also has a through punched opening 18, which is fully covered by the transfer element 16 on the front and is marked by dashed lines in FIG. 1. In the cross section of FIG. 2, which shows a section of the bank note 10 along the line II-II, the opening 18 and the full covering by means of the transfer element 16 are clearly recognizable. The transfer element 16 comprises two different security features 20 and 22 disposed one above the other, which are recognizable from opposite sides of the bank note 10. The first security feature 20 of the transfer element is recognizable through the opening 18 from the back, the second security feature 22 upon viewing the front of the bank note 10.

A possible layer structure for such a transfer element 16 or a security thread 12 and the optical effects occurring upon viewing now are explained in more detail with reference to FIG. 3.

Figure 3:
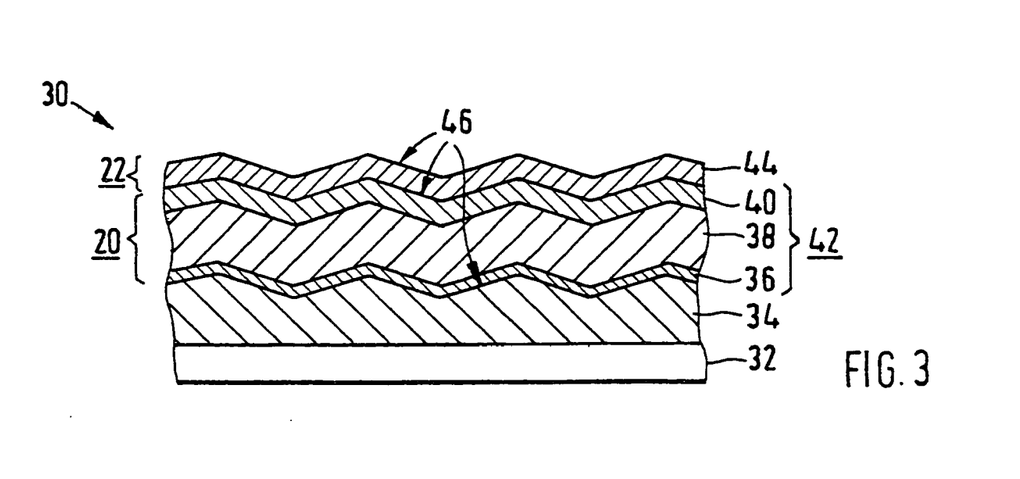
FIG. 3 shows the layer structure of a security element according to an embodiment of the invention.

The security element 30 of the embodiment shown in FIG. 3 contains a thin-layer element 42 with color shift effect, which is provided with an areal diffraction structure 46 and which forms the first security feature 20 recognizable from the back. Here an embossed lacquer layer 34 is applied onto a carrier foil 32 and a diffraction structure 46 is embossed into the embossed lacquer layer. Onto the embossed lacquer layer 34 then an absorber layer 36, a dielectric layer 38 and a reflection layer 40 made of aluminum are applied. The diffraction structure 46 of the embossed lacquer layer 34 continues to exist in the layers 36, 38 and 40 in a vertically upward direction. The absorber layer 36, the dielectric layer 38 and the reflection layer 40 together form a thin-layer element 42 with color shift effect, the exact effect of which is described, for example, in the print EP 0 395 410 B1.

When viewing the security element 30 from the side of the first security feature 20, a diffractive image produced by the diffraction structure 46 in combination with a color shift effect can be recognized.

Onto the reflection layer 40 of the thin-layer element 42 is applied a further reflection layer 44, in the embodiment a copper layer, as a second security feature 22. The diffraction structure 46 of the embossed lacquer layer 34 and of the thin-layer element 42 in a vertical direction continues to exist in the reflection layer 44, so that when viewing the security element 30 from the side of the second security feature 22 there can be recognized a diffractive image produced by the diffraction structure 46 having the characteristic color of the reflection layer 44, i.e. in the embodiment a copper-colored diffraction image.

Since the thin-layer element 42 and the reflection layer 44 have the same areal diffraction structure 46, they produce identical diffractive images, which, however, due to the opposing viewing directions are laterally reversed.

For the first reflection layer 40 instead of aluminum also another metal highly reflective in the visible spectral region, such as for example silver or nickel, is suitable. For the second reflection layer 44 instead of copper for example gold, iron or chromium can be used. It is understood, that the order of the first and second security feature can be changed.

Figure 4:
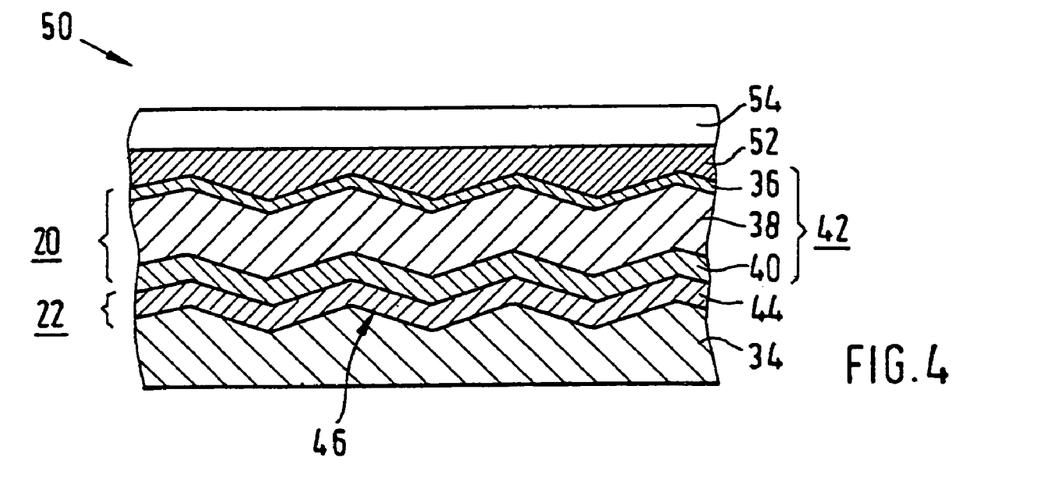
FIG. 4 shows the layer structure of a transfer element such as in FIG. 1 according to an embodiment of the invention.

Another layer structure for a transfer element 50 according to the invention is now illustrated with reference to FIG. 4. In this embodiment onto an embossed lacquer layer 34 provided with a diffraction structure 46 at first a copper layer 44 is applied, in which the diffraction structure 46 of the embossed lacquer layer 34 continues to exist. Onto the copper layer 44 a reflection layer 40 made of aluminum, a dielectric layer 38, and an absorber layer 36 is applied. As shown in the embodiment of FIG. 3 the layers 36, 38 and 40 together form a thin-layer element 42 with color shift effect. The diffraction structure 46 of the embossed lacquer layer 34 and of the copper layer 44 here continues to exist in the layers of the thin-layer element 42. In order to form a transfer element 50, the two security features 20 and 22 are applied onto a transfer foil 54 via an adhesive layer 52.

In the finished security element 50 when viewed from the side of the first security feature 20 there can be recognized a diffractive image produced by the diffraction structure 46 in combination with a color shift effect, and when viewed from the side of the second security feature 22 there can be recognized a laterally reversed diffractive image having the characteristic color of the reflection layer 44.

FIG. 5 to 9 in schematic representation show various designs of security elements according to the invention, each with recesses in different layers of the above-described layer structure. For clarity's sake the diffraction structure 46 is not shown in these Figures. It is understood, however, that the embodiments of the FIG. 5 to 9, too, are provided with a through diffraction structure in the two security features 20, 22. For clarity's sake the Figures only differ with respect to the design of the recesses and always are shown with the same layer structure. It is understood, however, that the shown variations can be combined with the various above-described layer structures.

Figure 5:
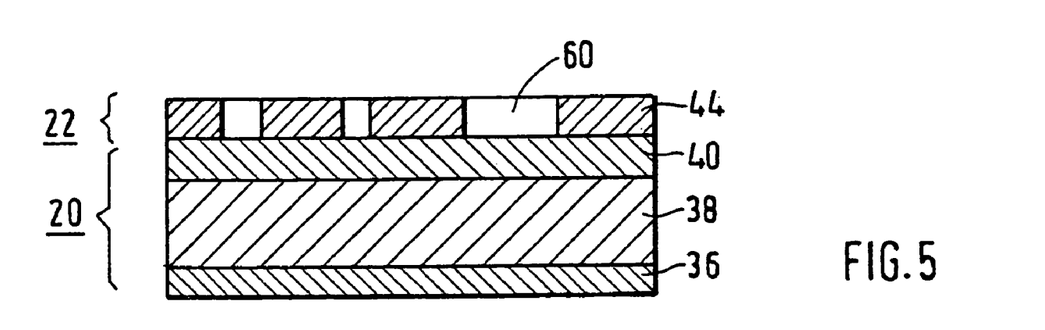
FIG. 5 to 9 show various designs of a security element with recesses according to preferred embodiments of the invention.

The embodiment in FIG. 5 shows the security features 20 and 22 disposed one above the other, with an absorber layer 36, a dielectric layer 38, a first reflection layer 40 made of aluminum and a second reflection layer 44 made of copper. The absorber layer 36, the dielectric layer 38 and the first reflection layer 40 together form a thin-layer element 42 with color shift effect.

Into the copper layer 44 are incorporated recesses 60 in the form of patterns, characters or codings. When viewing the security element from the side of the second security feature 22 the result is a "bi-metal-hologram", in which the viewer can recognize a copper-colored diffractive image with silver-colored diffraction structures in the recesses 60. From the side of the first security feature 20, as already described above, a laterally reversed diffractive image in combination with a color shift effect is recognizable. Such a design is extremely difficult to imitate and constitutes an optically appealing and easily explainable human identification feature for a document of value.

Figure 6:
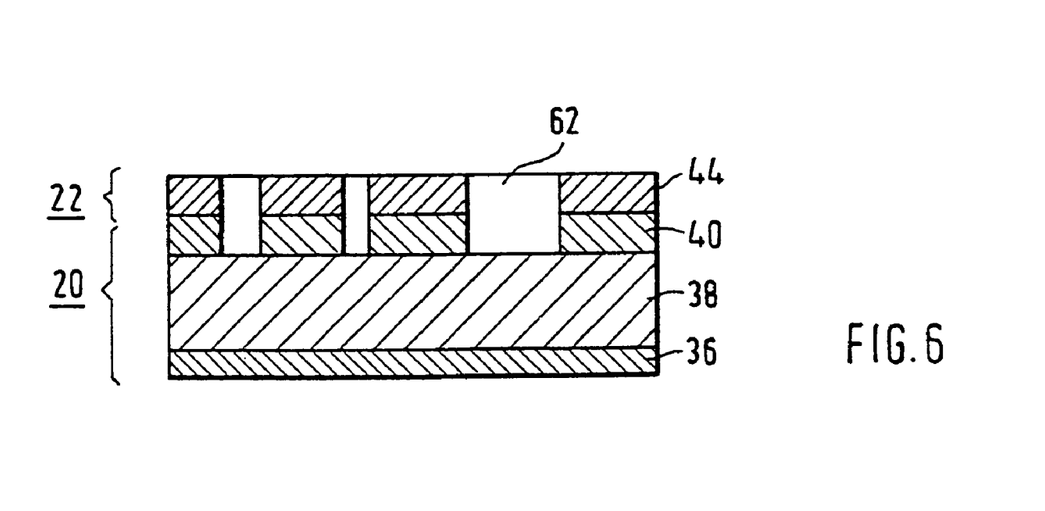

FIG. 6 shows another embodiment, in which the recess 62 congruently extends over the first reflection layer 40 and the second reflection layer 44. The areas provided with recesses 62 then, depending on the design of the thin-layer element 42, in transmitted light form transparent or semitransparent regions without diffractive effects. In particular, from the side of the first security feature 20 the viewer can recognize a diffractive image in combination with a color shift effect. In transmitted light transparent or semitransparent recesses 62 are visible. When viewing the security element from the side of the second security feature 22 there is recognizable a copper-colored diffractive image with recesses 62 being transparent or semitransparent in transmitted light.

Figure 7:
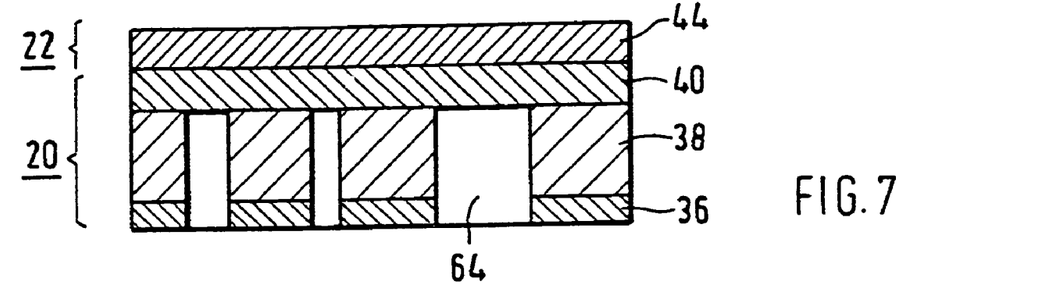

With the embodiment of FIG. 7 the recesses 64 are incorporated into the interference layer formed by absorber layer 36 and dielectric layer 38. Upon viewing from the side of the first security feature 20, in the areas not provided with recesses the result is a diffractive image in combination with a color shift effect, and in the recesses 64 the result is the silver-colored color impression of the first reflection layer 40 without color shift effect. When viewing from the side of the second security feature 22, the copper-colored diffractive image is recognizable in an unchanged manner.

Figure 8:
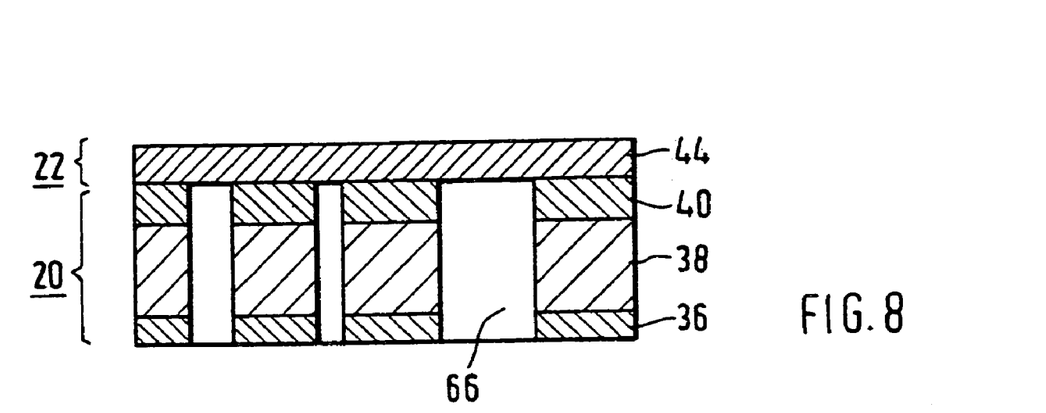

In FIG. 8 the recesses 66 extend through the interference layer 36, 38 and the first reflection layer 40 to the second reflection layer 44. When viewing from the side of the first security feature 20 thus in the areas not provided with recesses a diffractive image in combination with a color shift effect and in the recesses 66 the copper-colored color impression of the second reflection layer 44 is recognizable. From the side of the second security feature 22 again the copper-colored diffractive image is recognizable.

Figure 9:
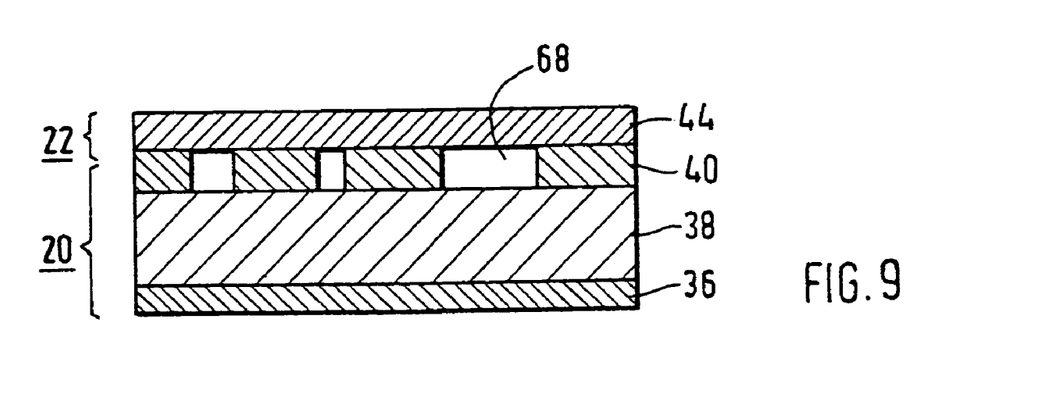

A further variant of a security element according to the invention is shown in FIG. 9. There merely the first reflection layer 40 has recesses 68 in the form of patterns, characters or codings. Since with this variant due to the recesses 68 the reflector of the thin-layer element 42 is formed partially by the copper-colored first reflection layer 40 and partially by the silver-colored second reflection layer 44, upon viewing from the side of the first security feature 20 beside the diffractive image in combination with the color shift effect additional color effects are recognizable. Due to the different color impressions and the different reflecting properties of the two reflection layers 40 and 44 the color shift effect is modulated with the pattern of the recess 68. When viewing the security element from the side of the second security feature 22 again the copper-colored diffractive image is recognizable.

The invention claimed is:

1. An areal security element for security papers or documents of value, with at least two different areal security features disposed one above the other, which each are recognizable upon viewing the security element from opposite sides, wherein the first security feature has a thin-layer element provided with an areal diffraction structure with color shift effect, which contains a first reflection layer with a first color effect the second security feature has a second reflection layer provided with an areal diffraction structure for producing a diffractive image, which shows a second color effect different from the first color effect, and wherein the thin-layer element of the first security feature and the reflection layer of the second security feature are provided with the same areal diffraction structure.

2. The security element according to claim 1, characterized in that the thin-layer element of the first security feature beside the first reflection layer contains an interference layer with color shift effect.

3. The security element according to claim 2, characterized in that the interference layer has at least one absorber layer and at least one dielectric layer, which is disposed intermediate between the first reflection layer and the absorber layer, preferably lies directly on the reflection layer.

4. The security element according to claim 1, characterized in that the first reflection layer and/or the second reflection layer is formed by a metal layer.

5. The security element according to claim 4, characterized in that the first and second reflection layer are formed by metals significantly differently reflecting in the visible spectral region.

6. The security element according to claim 4, characterized in that the first and second reflection layer are formed by at least one of different-colored metals, or the first reflection layer is formed by a metal highly reflective in the visible spectral region and the second reflection layer is formed by a metal poorly reflecting in the visible spectral region.

7. The security element according to claim 1, characterized in that the first reflection layer is formed by at least one of a metal of the group aluminum, silver or nickel, or the second reflection layer by a metal of the group copper, gold, iron or chromium.

8. The security element according to claim 1, characterized in that the first and second reflection layer are disposed directly one above the other.

9. The security element according to claim 8, characterized in that intermediate between the first and second reflection layer is disposed a spacer layer.

10. The security element according to claim 1, characterized in that at least one of the first or second security feature has recesses in the form of patterns, characters or codings.

11. The security element according to claim 10, characterized in that the second reflection layer has recesses in the form of patterns, characters or codings.

12. The security element according to claim 11, characterized in that upon viewing the security element from the side of the first security feature there is recognizable a diffractive image in combination with a color shift effect, and upon viewing the security element from the side of the second security feature there is recognizable a laterally reversed diffractive image with the second color impression in the areas not provided with recesses and with the first color impression in the recesses.

13. The security element according to claim 10, characterized in that the interference layer has recesses in the form of patterns, characters or codings.

14. The security element according to claim 13, characterized in that upon viewing the security element from the side of the first security feature in the areas not provided with recesses there is recognizable a diffractive image in combination with a color shift effect and in the recesses the color impression of the first reflection layer without color shift effect, and upon viewing the security element from the side of the second security feature there is recognizable a laterally reversed diffractive image with the second color impression.

15. The security element according to claim 10, characterized in that the first reflection layer and the interference layer have congruent recesses in the form of patterns, characters or codings.

16. The security element according to claim 15, characterized in that upon viewing the security element from the side of the first security feature in the areas not provided with recesses there is recognizable a diffractive image in combination with a color shift effect and in the recesses there is recognizable the color impression of the second reflection layer without color shift effect, and upon viewing the security element from the side of the second security feature there is recognizable a laterally reversed diffractive image with the second color impression.

17. The security element according to claim 10, characterized in that the first reflection layer and the second reflection layer have congruent recesses in the form of patterns, characters or codings.

18. The security element according to claim 17, characterized in that upon viewing the security element from the side of the first security feature there is recognizable a diffractive image in combination with a color shift effect with recesses being transparent or semitransparent in transmitted light, and upon viewing the security element from the side of the second security feature there is recognizable a laterally reversed diffractive image with the second color impression with recesses being transparent or semitransparent in transmitted light.

19. The security element according to claim 10, characterized in that the first reflection layer has recesses in the form of patterns, characters or codings.

20. The security element according to claim 19, characterized in that upon viewing the security element from the side of the first security feature there is recognizable a diffractive image in combination with a color shift effect with additional color effects, and upon viewing the security element from the side of the second security feature there is recognizable a laterally reversed diffractive image with the second color impression.

21. The security element according to claim 1, characterized in that the areal security features are applied onto a common carrier foil in particular a transparent carrier foil.

22. The security element according to claim 1, characterized in that the security element forms a security stripe, a security thread, such as a window security thread or a pendulum security thread.

23. The security element according to claim 1, characterized in that the security element forms a transfer element for applying onto a security paper or document of value, wherein the areal security features are applied via a separation layer onto a transfer foil.

24. A security paper for producing security documents, bank notes or ID cards, with a security element according to claim 1.

25. The security paper according to claim 24, with at least one through window area, which is covered with the security element, so that in the window area the two areal security features are recognizable upon viewing from opposite sides.

26. A document of value, bank note or ID card, with a security element according to claim 1.

27. The document of value according to claim 26, with at least one through window area, which is covered with the security element, so that in the window area the two areal security features are recognizable upon viewing from opposite sides.

28. A method for protecting goods comprising utilizing a security element according to claim 1.

29. A method for manufacturing an areal security element for security papers or documents of value, with the following procedure steps:
   a) manufacturing an embossed lacquer layer with an areal diffraction structure,
   b) applying a thin-layer element with color shift effect onto the embossed lacquer structure, which contains a first reflection layer with a first color effect, so that the diffraction structure of the embossed lacquer layer continues to exist in the thin-layer element and
   c) applying a second reflection layer with a second color effect different from the first color effect onto the thin-layer element, so that the diffraction structure of the embossed lacquer layer and of the thin-layer element continues to exist in the second reflection layer.

30. The method according to claim 29, characterized in that with the application of the thin-layer element an absorber layer, a dielectric layer and the first reflection layer are successively applied.

31. The method according to claim 29, characterized in that the second reflection layer is applied directly onto the first reflection layer.

32. The method according to claim 29, characterized in that into at least one of the second reflection layer, the thin-layer element, or the first reflection layer of the thin-layer element, there are incorporated recesses in the form of patterns, characters or codings.

33. A method for manufacturing an areal security element for security papers or documents of value, with the following procedure steps:
   α) manufacturing an embossed lacquer layer with an areal diffraction structure,
   β) applying a reflection layer with a predetermined color effect onto the embossed lacquer structure, so that the diffraction structure of the embossed lacquer layer continues to exist in the reflection layer, and
   χ) applying a thin-layer element with color shift effect onto the reflection layer, which contains a further reflection layer with a further color effect different from the predetermined color effect of the reflection layer applied first, so that the diffraction structure of the embossed lacquer layer and of the reflection layer applied first continues to exist in the thin-layer element.

34. The method according to claim 33, characterized in that with the application of the thin-layer element the further reflection layer, a dielectric layer and an absorber layer are successively applied.

35. The method according to claim 33, characterized in that the further reflection layer is applied directly onto the reflection layer applied first.

36. The method according to claim 33, characterized in that into at least one of the reflection layer applied first, the thin-layer element, or the further reflection layer, there are incorporated recesses in the form of patterns, characters or codings.

37. A security element of claim 9 wherein said spacer layer is transparent or semitransparent.

38. A method for protecting goods comprising utilizing a security paper according to claim 24.

39. A method for protecting goods comprising utilizing a document of value according to claim 26.

* * * * *